(12) United States Patent
Dinis

(10) Patent No.: US 12,710,069 B2
(45) Date of Patent: Aug. 18, 2026

(54) THREADED FASTENER

(71) Applicant: Goodrich Actuation Systems SAS, Vernon (FR)

(72) Inventor: David Dinis, Puteaux (FR)

(73) Assignee: Goodrich Actuation Systems SAS, Vernon (FR)

( * ) Notice: Subject to any disclaimer, the term of this patent is extended or adjusted under 35 U.S.C. 154(b) by 374 days.

(21) Appl. No.: 18/582,019

(22) Filed: Feb. 20, 2024

(65) Prior Publication Data

US 2024/0288026 A1 Aug. 29, 2024

(30) Foreign Application Priority Data

Feb. 23, 2023 (EP) .................................... 23305239

(51) Int. Cl.
*F16B 33/02* (2006.01)
*F16B 39/24* (2006.01)

(52) U.S. Cl.
CPC .............. *F16B 33/02* (2013.01); *F16B 39/24* (2013.01)

(58) Field of Classification Search
CPC ........ F16B 33/02; F16B 31/00; F16B 31/027; F16B 39/02; F16B 39/24; F16B 39/282
USPC ................................................ 411/1, 5, 366.1
See application file for complete search history.

(56) References Cited

U.S. PATENT DOCUMENTS 4,790,702 A * 12/1988 Maganias ............... F16B 39/28 411/417
6,293,595 B1 * 9/2001 Marc ..................... F16L 19/005 285/86
6,929,289 B1 * 8/2005 Guest .................... F16L 19/086 285/309
9,113,567 B2 * 8/2015 Stotz, Jr. ............... F16B 5/0241
2013/0189049 A1 * 7/2013 Stotz, Jr. ............... F16B 5/0241 411/111
2015/0284047 A1 * 10/2015 Takeuchi ............... B62K 21/12 74/484 R
2016/0146149 A1 * 5/2016 Soeda ..................... F16B 31/04 411/533

FOREIGN PATENT DOCUMENTS

DE 2611237 A1 9/1977
GB 2342135 A 4/2000

OTHER PUBLICATIONS

Abstract for DE2611237 (A1), Published: Sep. 22, 1977, 1 page.
European Search Report for Application No. 23305239.8, mailed Jul. 31, 2023, 5 pages.

* cited by examiner

*Primary Examiner* — Nicholas L Foster
(74) *Attorney, Agent, or Firm* — Kilpatrick Townsend & Stockton LLP

(57) ABSTRACT

A threaded fastener comprising a first threaded part defining an axis, A, from a first end to a second end thereof, the threaded part having a radially inwardly extending thread along a portion thereof between the first and the second end and a non-threaded portion between the thread and the second end The fastener also has a second threaded part defining an axis from a first end and a second end thereof and having a radially outwardly extending thread along a portion thereof between the first and the second end and a non-threaded portion between the thread and the first end. The fastener also includes a compressible part arranged to provide an axial load to one of the first and the second threaded parts when the parts are fastened together.

7 Claims, 2 Drawing Sheets

THREADED FASTENER

CROSS REFERENCE TO RELATED APPLICATIONS

This application claims priority to European Patent Application No. 23305239.8 filed Feb. 23, 2023, the entire contents of which is incorporated herein by reference.

TECHNICAL FIELD

The present disclosure relates to a threaded fastener assembly for attaching two threaded parts to each other in a secure manner.

BACKGROUND

There are many applications where two parts are fixed to each other by a threaded engagement, where one part is provided with an outer thread and the other part is fastened to it by means of a complementary inner thread. Often a tight threaded engagement provides a sufficiently secure attachment. In some applications, however, e.g. in high vibration environments and/or safety critical applications such as in aircraft and other vehicles or machines, there is a risk of the fastening inadvertently working loose. To prevent this, in such applications, an additional locking or securing part is used such as a locking wire or clip to prevent the fastening parts from unthreading from each other. This adds to the overall number of parts that need to be manufactured, assembled and maintained and may require special tools to fasten.

There is a desire for an improved threaded fastener that avoids the need for such additional locking parts whilst still maintaining a secure fastening even in vibrational environments.

SUMMARY

According to the disclosure, there is provided a threaded fastener comprising a first threaded part defining an axis from a first end to a second end thereof, the threaded part having a radially inwardly extending thread along a portion thereof between the first and the second end and a non-threaded portion between the thread and the second end, and a second threaded part defining an axis from a first end and a second end thereof and having a radially outwardly extending thread along a portion thereof between the first and the second end and a non-threaded portion between the thread and the first end, the fastener further comprising a compressible part arranged to provide an axial load to one of the first and the second threaded parts when the parts are fastened together. The first threaded part is arranged to be fastened around and to the second threaded part by rotating the inwardly extending thread of the first threaded part along the outwardly extending thread of the second threaded part until the inwardly extending thread and the outwardly extending thread no longer engage and the inwardly extending thread lies along the non-threaded portion of the second threaded part, and wherein the compressible part is preloaded such that when the inwardly extending thread and the outwardly extending thread no longer engage and the inwardly extending thread lies along the non-threaded portion of the second threaded part, the compressible part loads the inwardly extending thread axially into abutment with the outwardly extending thread to secure the first and second threaded parts axially together.

Also provided is a method of fastening two parts comprising providing a first part around a second part, creating a threaded engagement between a threaded portion of the first part and a threaded portion of the second part; threadedly fastening the first part to the second part by relative rotation of the parts until the threaded portion of the first part passes the threaded portion of the second part onto a non-threaded portion, and applying an axial force by means of a compressible member to cause axial abutment of the threaded positions of the first and second parts.

BRIEF DESCRIPTION

Examples of the threaded fastener according to the disclosure will be described with reference to the drawings. It should be noted that variations are possible within the scope of the claims.

DETAILED DESCRIPTION

The threaded fastener of this disclosure comprises a first threaded part defining an axis from a first end to a second end thereof, the threaded part having a radially inwardly extending thread along a portion thereof between the first and the second end and a non-threaded portion between the thread and the second end, and a second threaded part defining an axis from a first end and a second end thereof and having a radially outwardly extending thread along a portion thereof between the first and the second end and a non-threaded portion between the thread and the first end, the fastener further comprising a compressible part arranged to provide an axial load to one of the first and the second threaded parts when the parts are fastened together. The first threaded part is arranged to be fastened around and to the second threaded part by rotating the inwardly extending thread of the first threaded part along the outwardly extending thread of the second threaded part until the inwardly extending thread and the outwardly extending thread no longer engage and the inwardly extending thread lies along the non-threaded portion of the second threaded part, and wherein the compressible part is preloaded such that when the inwardly extending thread and the outwardly extending thread no longer engage and the inwardly extending thread lies along the non-threaded portion of the second threaded part, the compressible part loads the inwardly extending thread axially into abutment with the outwardly extending thread to secure the first and second threaded parts axially together.

Figure 1:
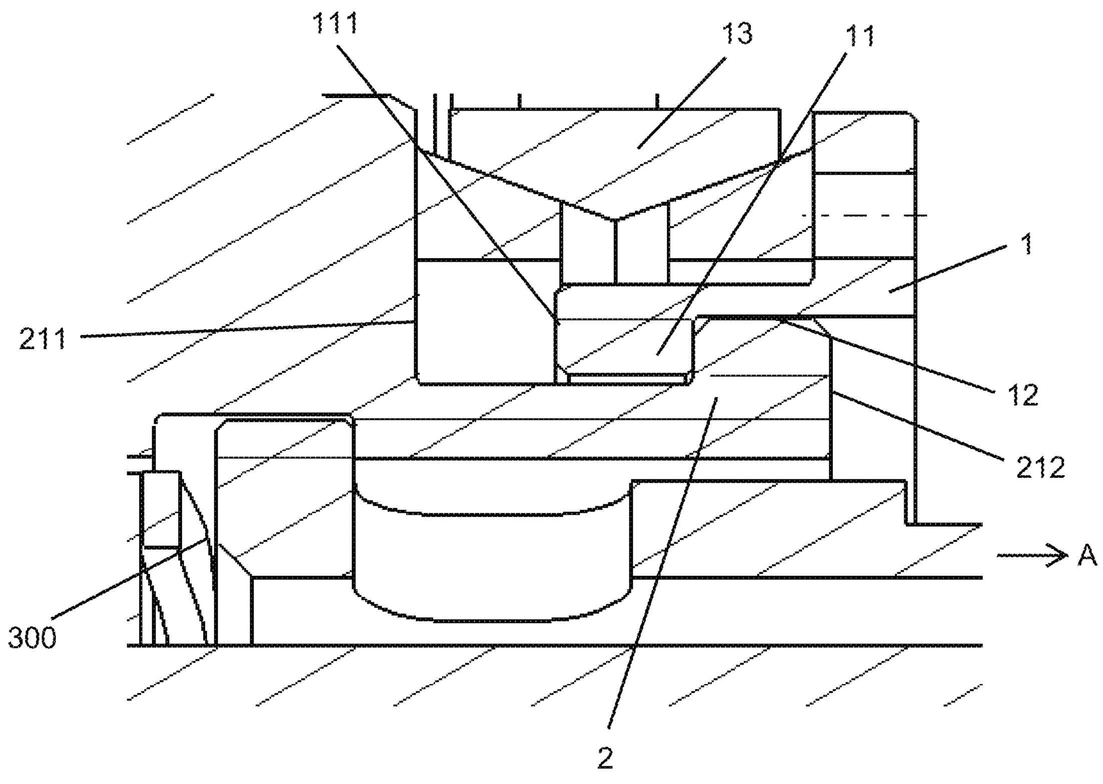
FIG. 1 is a schematic view of two examples of a threaded fastener according to the disclosure, both shown in the same assembly.
Figure 2:
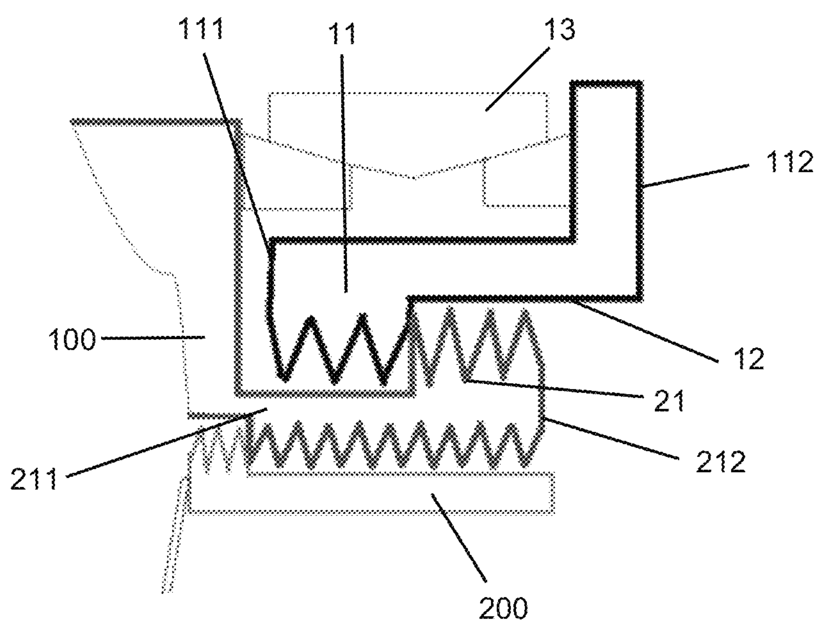
FIG. 2 is a close up of a detail of FIG. 1.

Two examples of the fastener can be seen in FIGS. 1 and 2. These are, in this case, combined into a single assembly but are shown to describe alternative embodiments of the fastener of this disclosure and each of the two fasteners could be used separately.

The first fastener consists of a first threaded part 1 and a second threaded part 2 to be fastened together by fastening the first part 1 over the second part by relative rotation of the two parts along the axis A. The first part 1 can be referred to as a nut 1 to be fastened to the second part 2 which can be referred to as the bolt. The first part has an inwardly threaded portion 11 between its first end 111 and its second end 112 and a non-threaded portion 12 between the threaded portion and the second end. The second part 2 has a complementary threaded portion 21 extending from its second end 212 and a non-threaded portion between the threaded portion and the first end 211 of the second part.

To secure the first part to the second part, the first end of the first part is screwed onto the second end 212 of the second part such that the threads of the two parts engage in threaded relationship. The nut is rotated relative to the bolt (or vice versa) so that the first part thread runs over the second part thread until it passes the threaded portion and meets the non-threaded portion. At this stage, the threaded portion of each part lies along the non-threaded portion of the other part and the threaded portions are in end-to-end axial abutment. In the example shown, therefore, the threaded portion of the second part acts as a collar or constraint preventing back rotation of the first part. In an example, the user can check that no threads are engaged by axially pushing against the first part. If the threads are not engaged, some axial movement of the part relative to the second part will occur. The threaded portions are biased against each other in this abutting relationship by the compressible part 13. The compressible part is a flexible, resilient component that is pre-loaded such that when the threaded portion of the first part has passed over the threaded portion of the second part, the compressible part applies a force to one of the first and second parts in the axial direction to keep the threaded parts in abutment and to prevent relative axial movement due to vibrations etc. which could cause unfastening. The pre-load may be such as to allow some slight axial movement if the user needs to check that the threads are no longer in engagement as mentioned above.

FIGS. 1 and 2 show two alternative examples for the compressible part. In a first example, shown between parts 1 and 2 and seen more clearly in FIG. 2, the compressible part 13 is in the form of a shock absorber located between a flange at the first end 112 of the first part and a flange 211 at the first end of the second part 2 and is loaded such as to bias the two flanges away from each other to maintain the abutment between the two threaded portions. In this way the nut 1 is captive and cannot be unscrewed.

In another example, shown between parts 100 and 200, the compressible part 300 may be in the form of a flexible washer but this also has the effect of biasing the two threaded portions axially into abutment and thus capturing the nut 100.

The threaded fastener according to the disclosure can be used in fastening any two nut/bolt type parts together. Some specific applications are, however, shown in FIGS. 3 and 4.

Figure 3:
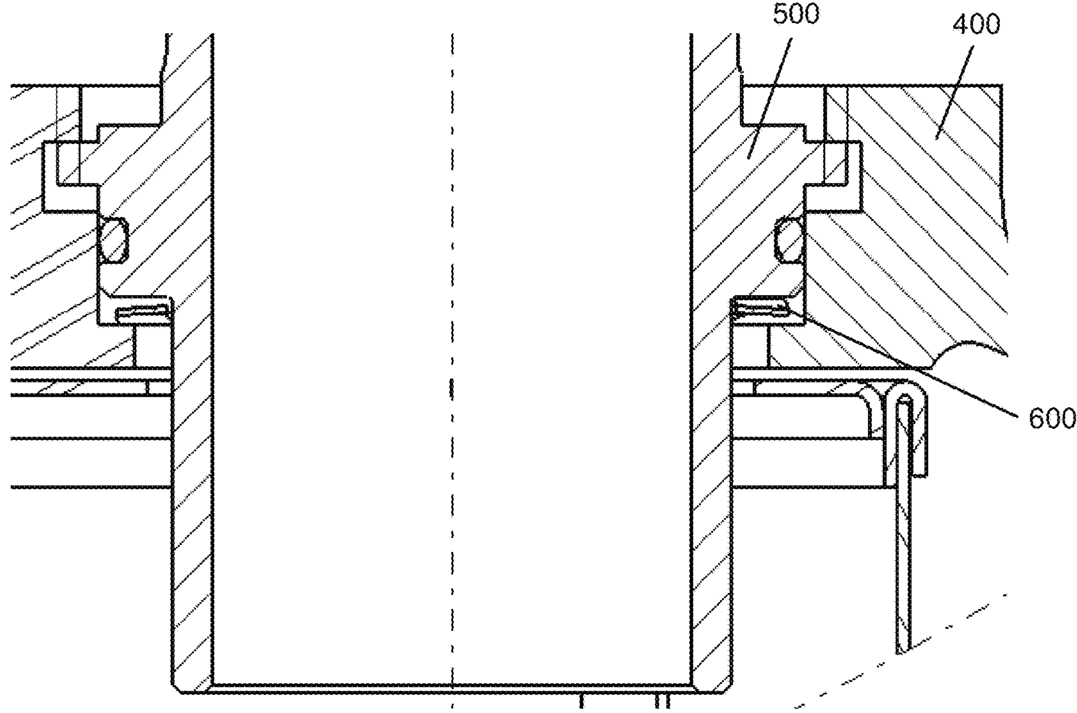
FIG. 3 shows an example of an application for a threaded fastener according to the disclosure

FIG. 3 shows how the fastener could be used in a reservoir connector where a connector 500 is fastened in a reservoir 400, each part having a threaded and non-threaded portion and the connector being captured relative to the reservoir by passing over its thread and being biased axially against the thread by a flexible washer 600.

Figure 4:
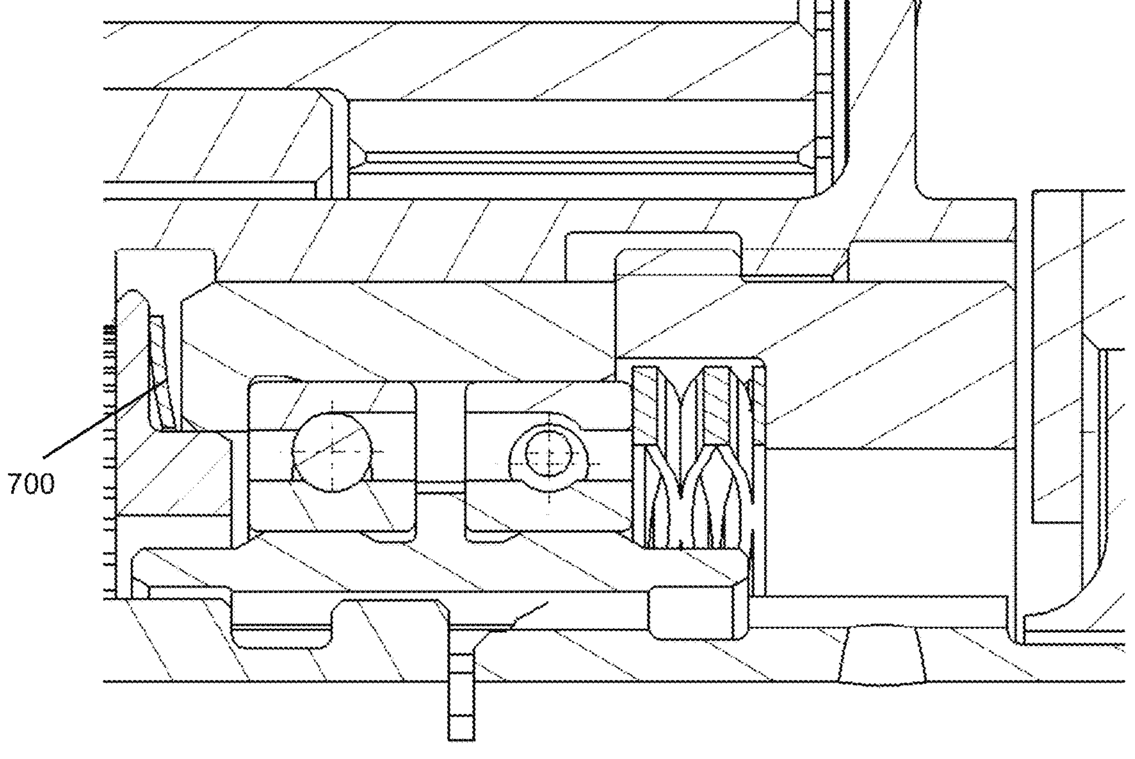
FIG. 4 shows another example of an application for a threaded fastener according to the disclosure

Another application for the fastener is in a gear box electromechanical actuator EMA as shown in FIG. 4, where a flexible washer 700 biases the threaded portions of two fastener parts against each other axially to capture the nut.

It will be appreciated, however, that there are many other applications in which the fastener of the disclosure is applicable and provides advantages.

Because of the capture of the nut by the threaded portions and the compressible part, there is no need for additional locking elements such as locking wires to prevent unfastening and so the overall size, cost, complexity and assembly time is reduced. There is no need for any special fastening tools and the parts are securely fastened together.

The invention claimed is:

1. A threaded fastener comprising:

a first threaded part defining an axis (A) from a first end to a second end thereof, the first threaded part having:

a radially inwardly extending thread along a portion thereof between the first and the second end and a non-threaded portion between the thread and the second end;

a second threaded part defining an axis from a first end and a second end thereof, the second threaded part having:

a radially outwardly extending thread along a portion thereof between the first and the second end and a non-threaded portion between the thread and the first end; and a compressible part arranged to provide an axial load to one of the first and the second threaded parts when the parts are fastened together;

wherein the first threaded part is arranged to be fastened around and to the second threaded part by rotating the inwardly extending thread of the first threaded part along the outwardly extending thread of the second threaded part until the inwardly extending thread and the outwardly extending thread no longer engage and the inwardly extending thread lies along the non-threaded portion of the second threaded part;

wherein the compressible part is preloaded such that when the inwardly extending thread and the outwardly extending thread no longer engage and the inwardly extending thread lies along the non-threaded portion of the second threaded part, the compressible part loads the inwardly extending thread axially into abutment with the outwardly extending thread to secure the first and second threaded parts axially together.

2. The threaded fastener of claim 1, wherein the compressible part is a shock absorber located between a flange at the first end of the first threaded part and a flange at the first end of the second threaded part and wherein the shock absorber is loaded such as to bias the two flanges away from each other to maintain the abutment between the two threaded parts.

3. The threaded fastener of claim 1, wherein the compressible part is a flexible washer.

4. The threaded fastener of claim 3, wherein the first threaded part is a nut and the second threaded part is a bolt.

5. The threaded fastener of claim 1 for use in a reservoir connector, wherein the first threaded part is a reservoir and the second threaded part is a connector.

6. The threaded fastener of claim 1 configured to fasten components in a gear box electromechanical actuator (EMA).

7. A method of fastening two threaded parts comprising:

providing a first threaded part around a second threaded part;

creating a threaded engagement between a threaded portion of the first threaded part and a threaded portion of the second threaded part to threadedly fasten the first part to the second part by relative rotation of the parts until the threaded portion of the first threaded part passes the threaded portion of the second threaded part onto a non-threaded portion; and applying an axial force by means of a compressible member to cause axial abutment of the threaded positions of the first and second parts.

* * * * *